(12) United States Patent
Watanabe et al.

(10) Patent No.: US 12,154,031 B2
(45) Date of Patent: Nov. 26, 2024

(54) INFORMATION PROCESSING SYSTEM, MODEL GENERATION PROCESSING SYSTEM, AND INFORMATION PROCESSING METHOD

(71) Applicant: Preferred Networks, Inc., Tokyo-to (JP)

(72) Inventors: Masaki Watanabe, Tokyo-to (JP); Tomoki Komatsu, Tokyo-to (JP)

(73) Assignee: Preferred Networks, Inc., Tokyo (JP)

( * ) Notice: Subject to any disclaimer, the term of this patent is extended or adjusted under 35 U.S.C. 154(b) by 1003 days.

(21) Appl. No.: 17/137,149

(22) Filed: Dec. 29, 2020

(65) Prior Publication Data

US 2021/0150353 A1 May 20, 2021

Related U.S. Application Data

(63) Continuation of application No. PCT/JP2019/025838, filed on Jun. 28, 2019.

(30) Foreign Application Priority Data

Jul. 2, 2018 (JP) .................. 2018-126366

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC ........................... G06N 3/08; G06N 3/04
See application file for complete search history.

(56) References Cited

U.S. PATENT DOCUMENTS 9,727,270 B2    8/2017  Ishida
11,377,313 B2 * 7/2022  Lydle .................. B65G 1/0407
(Continued)

FOREIGN PATENT DOCUMENTS

JP    H09-128362 A    5/1997
JP    H11-100013 A    4/1999
(Continued)

OTHER PUBLICATIONS

Haoyuan Hu et. al., "Solving a New 3D Bin Packing Problem with Deep Reinforcement Learning Method", arXiv:1708.05930v1 [cs.AI] Aug. 20, 2017.
(Continued)

*Primary Examiner* — David E Choi
(74) *Attorney, Agent, or Firm* — Foley & Lardner LLP

(57) ABSTRACT

There is proposed a device capable of performing processing regarding decision of optimum loading positions even if it does not know all packages to be loaded beforehand. One embodiment of the present invention includes: at least one memory; and at least one processing circuitry. The at least one processing circuitry is configured to execute: generating loading state information regarding an object loading state of a predetermined space where a plurality of objects will be loaded, under an assumption that a first object to be loaded is loaded at a loading position candidate in the predetermined space; and inputting the loading state information into a loading state evaluation model that outputs, when the loading state information is input therein, an evaluation value with respect to the object loading state of the predetermined space, and acquiring the evaluation value.

29 Claims, 10 Drawing Sheets

(56) References Cited

U.S. PATENT DOCUMENTS

| | | | |
|---|---|---|---|
| 2002/0106273 | A1 | 8/2002 | Huang et al. |
| 2004/0143465 | A1 | 7/2004 | Imanishi |
| 2004/0165980 | A1 | 8/2004 | Huang et al. |
| 2016/0054923 | A1 | 2/2016 | Ishida |
| 2018/0222046 | A1* | 8/2018 | Gotou .................... B25J 9/1612 |
| 2018/0257225 | A1* | 9/2018 | Satou .................... B25J 9/1697 |
| 2020/0016742 | A1* | 1/2020 | Ishikawa ................ B25J 19/023 |
| 2021/0097636 | A1* | 4/2021 | Oobori ............. G06Q 10/06315 |

FOREIGN PATENT DOCUMENTS

| | | |
|---|---|---|
| JP | H11-208604 A | 8/1999 |
| JP | 2000-076220 A | 3/2000 |
| JP | 2000-305920 A | 11/2000 |
| JP | 2001-236340 A | 8/2001 |
| JP | 2003-335417 A | 11/2003 |
| JP | 2004-203603 A | 7/2004 |
| JP | 2008-265970 A | 11/2008 |
| JP | 4680345 B2 | 5/2011 |
| JP | 2017-210302 A | 11/2017 |
| WO | WO-2007/119898 A1 | 10/2007 |
| WO | WO-2014/167704 A1 | 10/2014 |
| WO | WO-2018/038815 A1 | 3/2018 |

OTHER PUBLICATIONS

Sani Tijjani et.al., "An Approach for Maximizing Container Loading and Minimizing the Waste of Space Using Q-Learning", 2013 The International Conference on Technological Advances in Electrical, Electronics and Computer Engineering (TAEECE), May 2013.

* cited by examiner

INFORMATION PROCESSING SYSTEM, MODEL GENERATION PROCESSING SYSTEM, AND INFORMATION PROCESSING METHOD

CROSS-REFERENCE TO RELATED APPLICATION (S)

This application is a Continuation of International Application No. PCT/JP2019/25838, filed on Jun. 28, 2019, the entire contents of which is hereby incorporated by reference.

FIELD

Embodiments described herein relate generally to an information processing system, a model generation processing system, and an information processing method.

BACKGROUND

For a distribution industry, how to load packages in a space for loading packages, such as a container or a truck bed, is a very important task. In recent years, it is often the case where optimum loading positions of respective packages are judged by a computer.

A conventional method in which a computer judges optimum loading positions of respective packages, is based on the presupposition that the number of packages to be loaded, and sizes of the respective packages are known beforehand. For example, the computer decides loading positions by using an algorithm which realizes optimum combinations of the loading positions of the respective packages. However, when handling a package-delivery service and the like, it is often the case where an on-line response is performed such that every time a package is arrived, the package is loaded, from viewpoints of operation time, operation space, and so on. In such a case, optimum loading positions of respective packages are still judged based on experiences of an operator.

DETAILED DESCRIPTION

Figure 1:
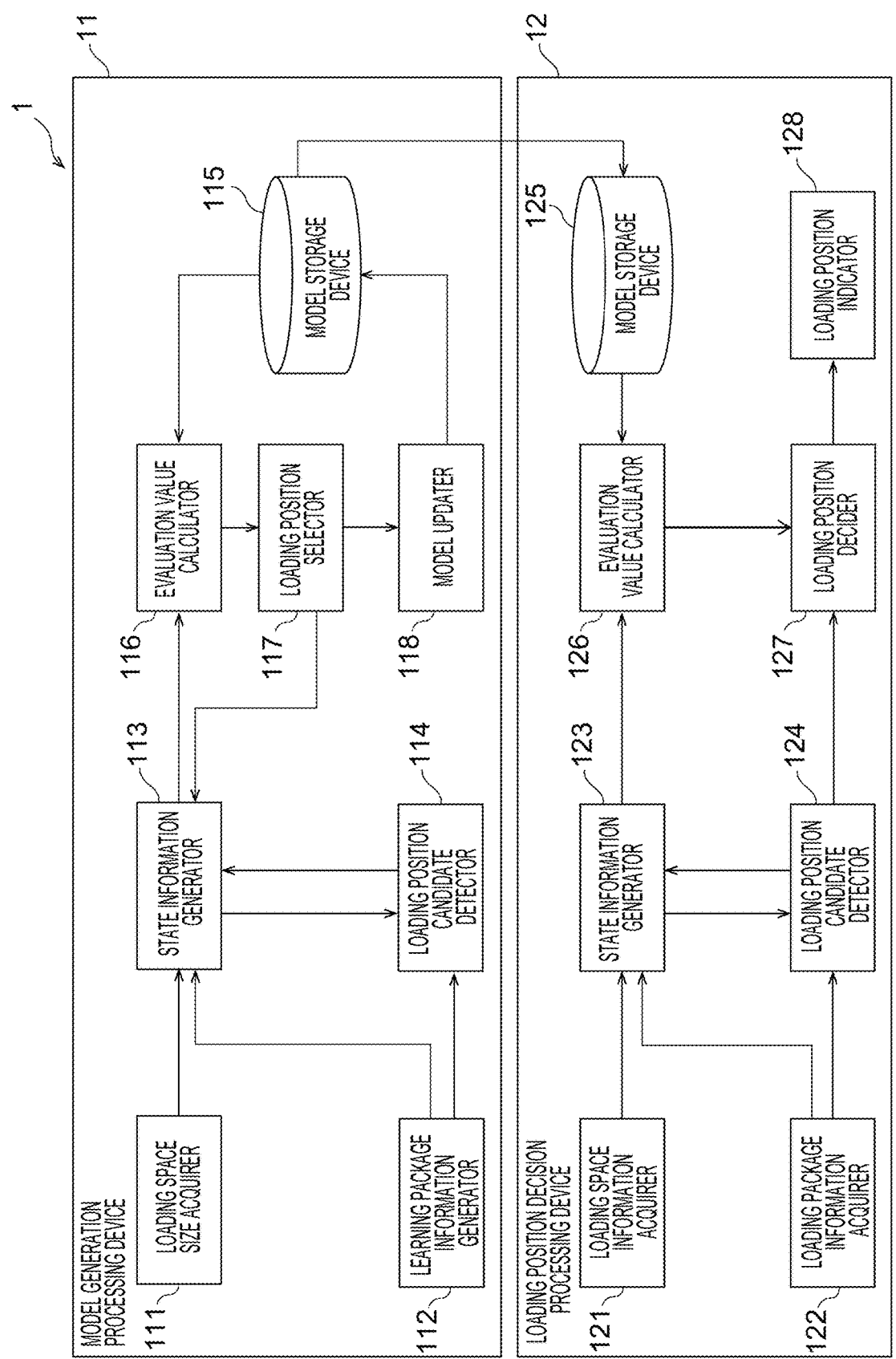
FIG. 1 is a block diagram illustrating one example of a loading operation support system according to a first embodiment.

There is proposed a device capable of performing processing regarding decision of optimum loading positions even if it does not know all packages to be loaded beforehand.

One embodiment of the present invention includes: at least one memory; and at least one processing circuitry. The at least one processing circuitry is configured to execute: generating loading state information regarding an object loading state of a predetermined space where a plurality of objects will be loaded, under an assumption that a first object to be loaded is loaded at a loading position candidate in the predetermined space; and inputting the loading state information into a loading state evaluation model that outputs, when the loading state information is input therein, an evaluation value with respect to the object loading state of the predetermined space, and acquiring the evaluation value.

Hereinafter, embodiments of the present invention will be described while referring to the drawings.

First Embodiment

FIG. 1 is a block diagram illustrating one example of a loading operation support system according to a first embodiment. A loading operation support system 1 according to the first embodiment includes a model generation processing device 11, and a loading position decision processing device 12.

The model generation processing device 11 includes a loading space size acquirer 111, a learning package information generator 112, a state information generator 113, a loading position candidate detector 114, a model storage device 115, an evaluation value calculator 116, a loading position selector 117, and a model updater 118.

The loading position decision processing device 12 includes a loading space information acquirer 121, a loading package information acquirer 122, a state information generator 123, a loading position candidate detector 124, a model storage device 125, an evaluation value calculator 126, a loading position decider 127, and a loading position indicator 128.

The loading operation support system 1 according to the first embodiment is a system that designates, with respect to an object to be loaded in a predetermined space, a position at which the object should be loaded (loading position). The model generation processing device 11 generates a loading state evaluation model which evaluates a loading state of an object in a predetermined space. The loading position decision processing device 12 decides the loading position of the object by using the loading state evaluation model, and outputs the loading position. In a manner as described above, the loading operation support system 1 supports the loading operation. It can be supposed that the loading operation support system 1 is utilized in a case where packages are loaded in a bed of a delivery vehicle, a case where stock is loaded in a warehouse, and so on, for example.

Note that hereinafter, an object to be loaded in a predetermined space will be described as a "package" for the sake of convenience of explanation, but, an object to be loaded is not limited by the term.

The predetermined space is only required to be a three-dimensional space whose size (lengths in vertical, horizontal, and height directions) is previously determined. The predetermined space includes, as a matter of course, a container, a ship's hold, a storeroom, and so on which are generally used for loading packages, and one section whose periphery is not surrounded by walls or the like is also included in the predetermined space as long as its size is defined. The predetermined space will be described as a "loading space" hereinbelow. Note that as long as the loading space is not limited by its shielding, for example, a wall of a storeroom or the like, a package can be loaded from an upper direction, a horizontal direction, or both the upper and horizontal directions.

The loading operation support system 1 decides a loading position suitable for satisfying a desired purpose. It can be considered that the desired purpose is to load packages as much as possible, to reduce a gap between mutual loaded packages as much as possible, and to prevent, as much as possible, loaded packages from being collapsed, for example. Here, the loading operation support system 1 tries to load packages as much as possible in the loading space. In order to achieve this, the loading position decision processing device 12 decides, with respect to a package to be loaded in a loading space, a loading position suitable for increasing a filling rate of packages in the loading space. The filling rate of the loading space indicates a ratio of packages in the loading space, to the loading space. That is, the filling rate of the loading space is represented by (total volume of packages in loading space)/(volume of inside of loading space). Even if one package is put on any place, the same filling rate is obtained at that time, but, when packages are loaded to the limit, the number of loaded packages is different depending on arrangement of the packages, resulting in that a difference is generated in the filling rate. That is, the loading position decision processing device 12 decides loading positions so that the total volume of loaded packages becomes large conclusively.

Note that the loading position decision processing device 12 does not need sizes of all packages to be loaded when deciding a loading position of package, and the loading positions of the respective packages are individually decided. For example, in a case where there are a first package to be loaded, and a second package to be loaded after the first package, the loading position decision processing device 12 decides a loading position of the first package, and then starts processing of deciding a loading position of the second package. The loading position decision processing device 12 can decide the loading position of the first package even if it does not recognize a size of the second package. That is, when deciding a loading position of a certain package, information of a package subsequent to the certain package is not necessary.

To a conventional device that designates a loading position, information of all packages to be loaded is given, and the device designates respective positions so that the all packages can be loaded efficiently. For example, it is recognized, beforehand, that there are first to n-th (n is an integer larger than one) packages, sizes of the respective first to n-th packages are given to the conventional device, and the conventional device decides the respective positions of the first to n-th packages. In a manner as above, the conventional device has to know all packages to be loaded before deciding the loading positions.

On the other hand, loading positions of respective packages are individually decided by the loading position decision processing device 12 according to the present embodiment, so that the device does not need to know all packages to be loaded. For example, there is a case where an on-line operation is performed such that the whole picture regarding packages to be loaded is not given, and the packages are loaded on arrival in a loading space. The conventional device cannot respond to such an on-line operation. However, in the loading operation support system 1 of the present embodiment, an operator can recognize, every time a package is arrived, a loading position of the arrived package.

Note that as long as an order of loading packages is designated, pieces of information regarding a plurality of packages may be simultaneously given to the loading position decision processing device 12. In that case, the loading position decision processing device 12 decides loading positions of packages according to the order.

Note that in the above description, it is supposed that the generation of the loading state evaluation model and the designation of loading position by using the loading state evaluation model are performed by separate devices. However, it is also possible to design such that the model generation processing device 11 and the loading position decision processing device 12 are integrated to one device, and the one device performs the both pieces of processing. In that case, the constituent elements common to the model generation processing device 11 and the loading position decision processing device 12 may be integrated to one constituent element or separately provided.

Further, FIG. 1 illustrates main constituent elements which seem to be required for the generation of the loading state evaluation model and the designation of the loading position by using the loading state evaluation model, but, the other constituent elements may also be included. Further, the respective devices and constituent elements may be segmentized or integrated together. For example, there can be considered a case where the loading position decision processing device 12 is divided into a first device including the loading space information acquirer 121, the loading package information acquirer 122, the state information generator 123, the loading position candidate detector 124, the model storage device 125, and the evaluation value calculator 126, and a second device including the loading position decider 127 and the loading position indicator 128. In this case, it can be considered that respective evaluation values to be described later are calculated by the first device to be transmitted to the second device, and the second device decides and outputs a loading position based on the respective evaluation values. Further, it is also possible that a user decides a loading position based on the respective evaluation values obtained by the first device. Alternatively, there can also be considered a case where the loading position decision processing device 12 is divided into a third device including the loading space information acquirer 121, the loading package information acquirer 122, and the state information generator 123, and a fourth device including the loading position candidate detector 124, the model storage device 125, the evaluation value calculator 126, the loading position decider 127, and the loading position indicator 128. In this case, it can be considered that a height map to be described later is calculated by the third device to be transmitted to the fourth device, and the fourth device decides and outputs a loading position based on the height map.

Further, it is also possible that the constituent elements exist in an external device which is neither the model generation processing device 11 nor the loading position decision processing device 12, and the model generation processing device 11 and the loading position decision processing device 12 acquire, from the external device, processing results obtained by the constituent elements in the external device. For example, it is also possible to design such that the loading position candidate detector 124 is made to exist in a device different from the loading position decision processing device 12, to thereby distribute a processing load of the loading position decision processing device 12.

Further, it is set that the model generation processing device 11, the loading position decision processing device 12, an acquisition source of information (not illustrated), and an output destination of information (not illustrated) can perform transmission/reception of data via a communication network or the like.

The respective constituent elements of the loading operation support system 1 will be described. First, the model generation processing device 11 will be described.

The model generation processing device 11 generates a loading state evaluation model through performance of reinforcement learning. Therefore, the model generation processing device 11 can also be called a reinforcement learning device. As the reinforcement learning, Value Iteration can be used. The Value Iteration includes various methods such as TD (Temporal Difference Learning), Q-learning, and DQN (Deep Q-Network), and any of the above may be employed. Examples of constituent elements for executing the reinforcement learning will be described below.

The loading space size acquirer 111 externally acquires a size of a loading space. The size may be acquired from a user via an input interface included in the model generation processing device 11, or it may also be acquired from an external device. In the present embodiment, it is designed that the size of the loading space is set as a range capable of loading packages. Note that the range capable of loading packages may also be smaller than the size of the loading space.

The learning package information generator 112 generates information regarding packages to be used for the reinforcement learning for generating the loading state evaluation model. Hereinafter, the information will be described as "learning package information". The learning package information is test data, and includes sizes of respective packages, and an order of arrival of the packages. That is, the learning package information generator 112 decides the sizes of the respective packages and the order of arrival of the packages. Note that in the present embodiment, the order of arrival of the packages matches an order of loading the packages.

The present embodiment will be explained in which a package having a rectangular parallelepiped shape is assumed, and a size of the package is expressed by length, width, and height. The size of each package may be decided based on sample data such as recordings of packages which have been actually loaded so far, or it may also be decided in a random manner. Further, when a size of a package is classified into a plurality of classes based on standards or the like, the size may be selected from those classes. The information regarding the recordings, the standards, and the like may be registered beforehand in the learning package information generator 112, or the learning package information generator 112 may externally acquire the information.

Figure 2:
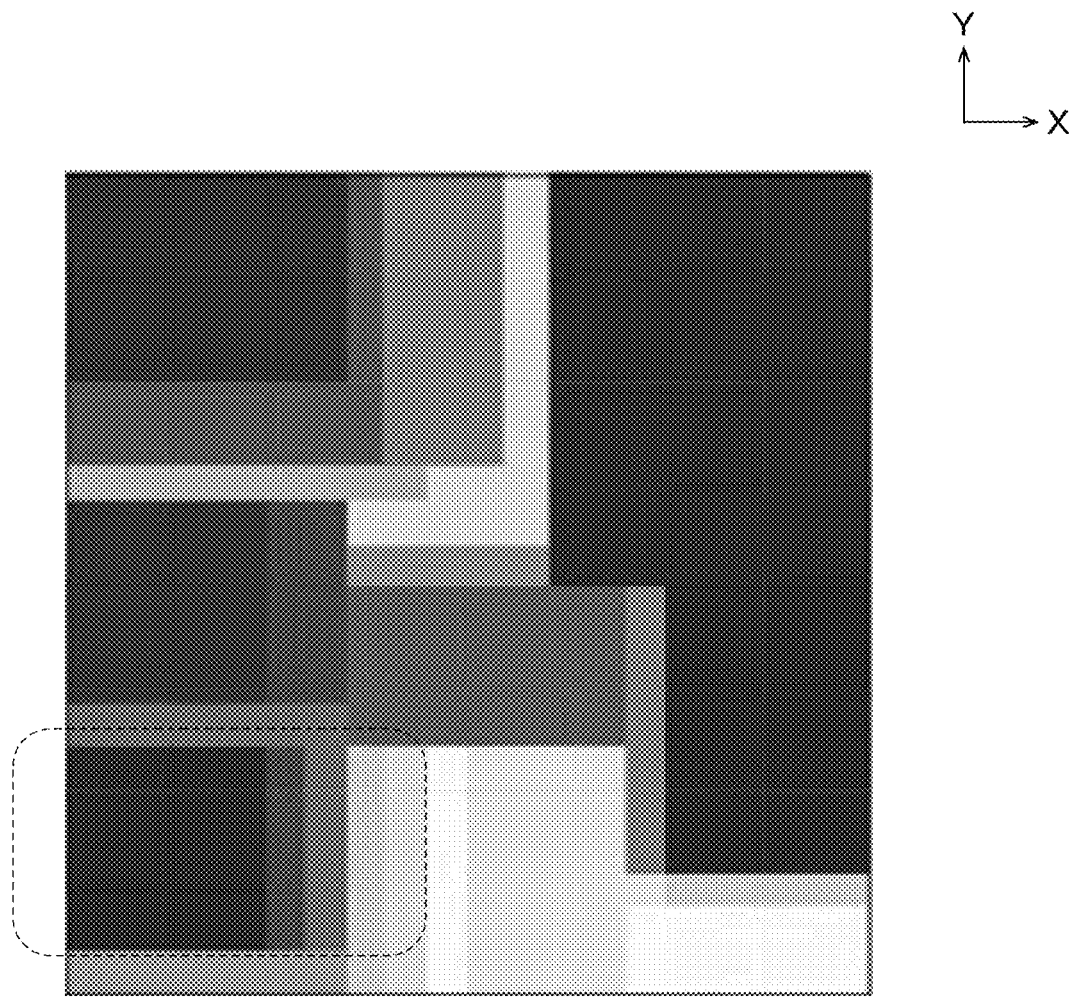
FIG. 2 is a diagram illustrating one example of a height map.

The state information generator 113 generates state information regarding a loading state of packages in the loading space. In the present embodiment, information regarding a height of the entire packages loaded in the loading space, is generated as the state information. The information will be described as a "height map". FIG. 2 is a diagram illustrating one example of the height map. The height map in the example of FIG. 2 is a top view illustrating a state when the loading space is seen from above, and is also a heat map in which a height of an upper end of the uppermost package that exists in each section that is previously set in the loading space, is expressed by a color gradation. It is indicated that the darker the color, the higher the upper end of the package. The height of the upper end of the uppermost package existing in a section is defined as a "height of section". That is, the height map indicates a height of the entire loaded packages in respective sections. As above, by using the height map, it is possible to indicate the height of the entire packages loaded in the loading space.

In the present embodiment, a shape of the section is set to a rectangular shape in accordance with the package having a rectangular parallelepiped shape which is supposed as described above. Here, each section is generated by dividing a floor surface of the loading space into a lattice shape, but, the method of generating sections may be appropriately determined. Although it is supposed that a size of the section is previously determined by taking a processing load, estimation precision, and so on into consideration, the state information generator 113 may change the size of the section in accordance with a designated value input into the model generation processing device 11. Further, the size of the section may be different for each section.

In the present embodiment, an end of each package is adjusted to match a boundary line of the section in the height map. For example, when sizes of packages are not unified, the boundary line and the end of the package cannot be matched perfectly, so that the state information generator 113 rounds the size of the package in accordance with the section, and then generates the height map. Note that the learning package information generator 112 may generate the size of the package in accordance with the section. Further, when the size of the package is any of previously determined standard sizes, the size of the section may be adjusted so that the boundary line and the end of the package can perfectly match.

Note that the height map is not always image data. The height map may be represented as data in which information indicating positions of sections (for example, a row number and a column number) and a height of packages in the sections, are combined. That is, the height map may employ any format as long as it can recognize the height in each section.

Further, when loading position candidates to be described later are transmitted to the state information generator 113 from the loading position candidate detector 114, the state information generator 113 generates a height map under an assumption that a package is loaded at any of the loading position candidates, for each loading position candidate. The height map will be described as a "height map candidate".

Further, when the loading position selected from the loading position candidates is transmitted to the state information generator 113, the state information generator 113 sets a height map candidate corresponding to the loading position, to a height map at a point of time of loading the next package. The height map is updated in a manner as described above.

Note that the height map candidate can be generated by increasing a height of each section included in the decided loading position or loading position candidate, by an amount of height of a package to be loaded this time.

The loading position candidate detector 114 uses the learning package information and the height map, to detect a position at which a package can be loaded. The detected position will be described as a "loading position candidate". For example, it can be considered to set a position at which a contact ratio of a bottom surface is a threshold value or more, to a loading position candidate. The contact ratio of the bottom surface indicates a ratio of a contact region between a bottom surface of a package and a floor surface of the loading space or an upper surface of another package, to the bottom surface of the package. That is, the contact ratio of the bottom surface means (area of contact region)/(area of entire bottom surface).

Figure 3A:
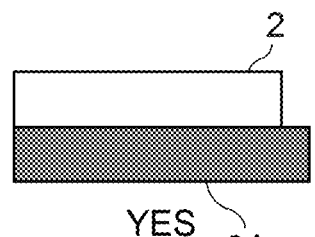
FIGS. 3A-3F are diagrams explaining yes/no of detection of loading position candidates based on a bottom surface contact ratio.
Figure 3B:
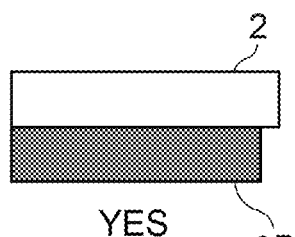
Figure 3C:
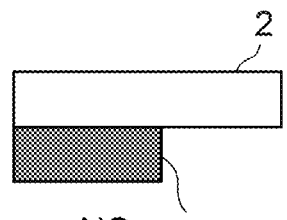
Figure 3D:
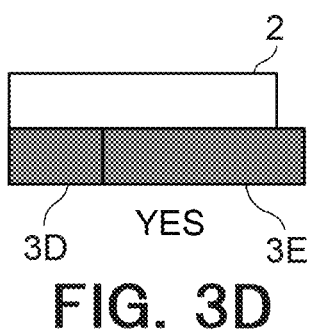
Figure 3E:
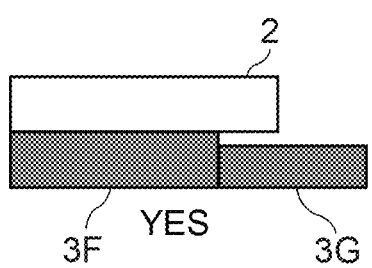
Figure 3F:
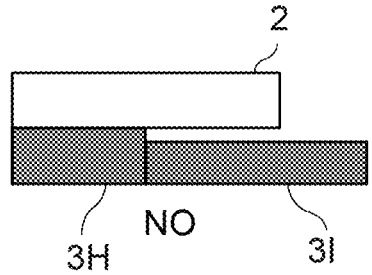

FIGS. 3A-3F are diagrams explaining yes/no of detection of loading position candidates based on a bottom surface contact ratio. FIG. 3 illustrates positional relationships between a package 2 to be loaded and already-loaded packages 3 (3A to 3I). Further, whether or not a position is detected as the loading position candidate, is indicated by YES or NO. The position of the package 2 in each of FIG. 3(A) and FIG. 3(B) is detected as the loading position candidate since the bottom surface contact ratio is large. The position of the package 2 in FIG. 3(C) is not detected as the loading position candidate since the bottom surface contact ratio is small. In FIG. 3(D), the package 2 is brought into contact with both the package 3D and the package 3E. In such a case, the bottom surface contact ratio is calculated without distinguishing the package 3D and the package 3E. Therefore, the position of the package 2 in FIG. 3(D) is detected as the loading position candidate since the bottom surface contact ratio is large. In FIG. 3(E), although the package 2 is brought into contact with only the package 3F due to a difference in height between the package 3F and the package 3G, the bottom surface contact ratio with respect to the package 3F is large, and thus the position of the package 2 is detected as the loading position candidate. In FIG. 3(F), the package 2 is brought into contact with only the package 3H due to a difference in height between the packages 3H and 3I, and since the bottom surface contact ratio with respect to the package 3H is small, the position of the package 2 in FIG. 3(F) is not detected as the loading position candidate.

The loading position candidate detector 114 searches a position at which the bottom surface contact ratio becomes the threshold value or more, based on the height map, and sets the detected position to the loading position candidate. Further, if there is a section whose height exceeds an upper limit value when a package is put on the detected loading position candidate, the loading position candidate is designed not to be detected as the loading position candidate. A condition for deciding the loading position candidate as described above, may be appropriately determined.

As the detection method, a publicly-known simulation method may be used. Further, the loading position candidate detector 114 may rotate a package when deciding the loading position. That is, the length, the width, and the height of the package may be switched. Note that some packages are prohibited from being an inverted state and the like. For this reason, it is also possible to add limitation in a rotational direction such that rotation in which a rotation axis is parallel to a vertical direction is allowed, and the other rotation is prohibited.

The model storage device 115 stores a loading state evaluation model. The loading state evaluation model is a model which outputs, when information regarding a loading state of a package in a predetermine space is input therein, an evaluation value with respect to the loading state. Here, in order to increase the filling rate of the loading space, the evaluation value obtained by the loading state evaluation model is set to a value regarding a total capacity of packages capable of being loaded from the loading state. Note that what is set to the evaluation value, may be appropriately determined according to purposes. For example, a value regarding a loading capacity of packages, such as information regarding the filling rate of packages in the predetermined space, information regarding the total capacity of packages, information regarding an available capacity capable of loading packages, or information regarding the total capacity of packages capable of being loaded, can be used as the evaluation value. Further, it is also possible to calculate the evaluation value by using the information regarding the loading capacity of packages and another information. When the value regarding the total capacity of packages capable of being loaded is used as the evaluation value, the higher the evaluation value, the larger the total capacity, which means that there is still room for loading packages. When, among a plurality of height map candidates, a height map candidate with high evaluation value calculated by the learned loading state evaluation model is continuously selected, it is possible that, consequently, a lot of packages are loaded, which can increase the filling rate of the loading space. Therefore, the evaluation value obtained by the loading state evaluation model is also a value indicating whether the input loading state is a state suitable for increasing the filling rate of packages in the predetermined space. The reinforcement learning is performed to make the evaluation value obtained by the loading state evaluation model to be a proper value.

The configuration of the loading state evaluation model may be changed according to a method of the reinforcement learning. It is possible to employ an evaluation function which outputs an evaluation value by combining feature amounts of the loading state, or a neural network such as a convolutional neural network (CNN) used in DQN. For example, it is also possible to design such that by inputting image data of a height map candidate in an input layer of CNN, arithmetic operations in respective intermediate layers are performed, and then an evaluation value of the height map candidate is output from an output layer.

The evaluation value calculator 116 inputs the height map candidate in the loading state evaluation model, and obtains the evaluation value from the loading state evaluation model. The evaluation value calculator 116 may also adjust the evaluation value obtained by the loading state evaluation model, and the evaluation value calculated by the evaluation value calculator 116 and the evaluation value obtained by the loading state evaluation model may not necessarily match perfectly. In a manner as above, the evaluation value calculator 116 uses the loading state evaluation model to calculate the evaluation value with respect to the height map candidate.

The loading position selector 117 selects one of the loading position candidates based on a predetermined policy, to set the selected loading position candidate to a loading position of a package to be loaded this time. As the policy, there can be considered greedy in which a loading position candidate with maximum evaluation value is selected, ε-greedy in which loading position candidates are randomly selected at a probability of ε, and a loading position candidate with maximum evaluation value is selected at a probability of 1−ε, and so on, for example.

The model updater 118 evaluates validity of the evaluation value according to the selected loading position, to thereby update a parameter of the loading state evaluation model in the model storage device 115. The updating method may be appropriately determined according to the types of the reinforcement learning. For example, it is possible that a filling rate at a point of time at which a package cannot be loaded any more is fed back, and validity of the evaluation value with respect to the loading state at each point of time of loading a package is evaluated, to thereby update the parameter. As the loading state evaluation model is updated, it becomes possible for the loading state evaluation model to calculate further proper evaluation values.

Figure 4:
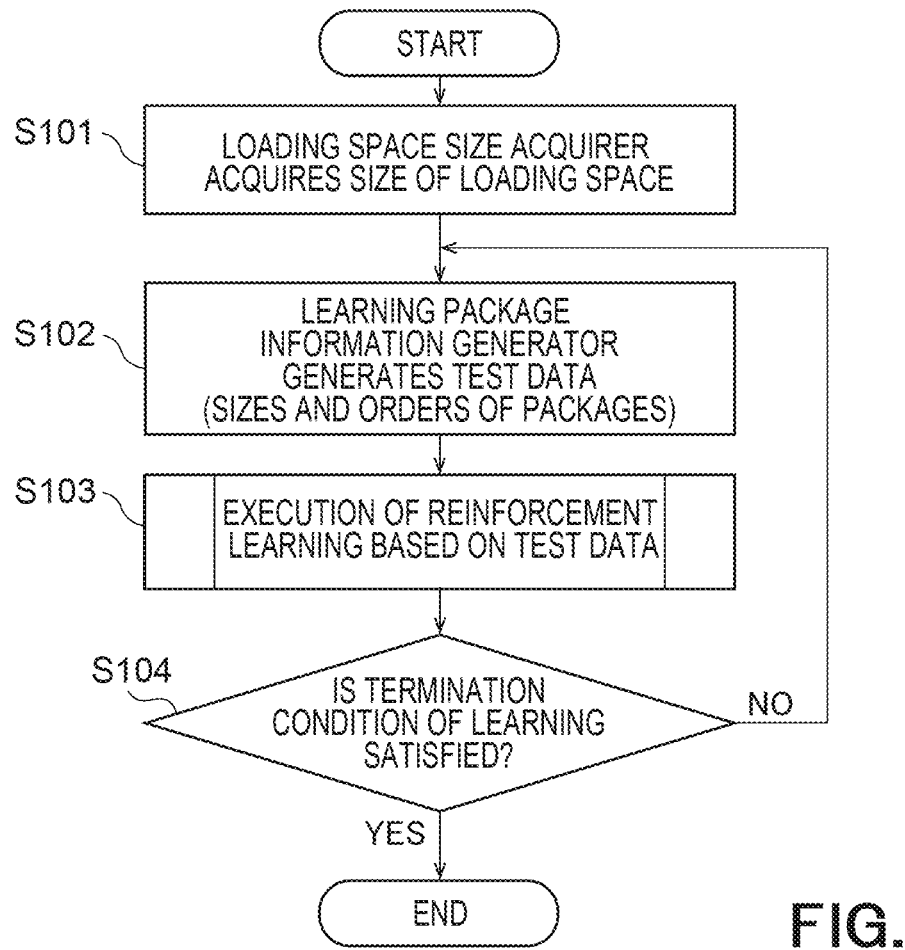
FIG. 4 is a schematic flow chart of model generation processing performed by a model generation processing device according to the first embodiment.

A flow of processing performed by the model generation processing device 11 will be described. FIG. 4 is a schematic flow chart of model generation processing performed by the model generation processing device 11 according to the first embodiment.

First, the loading space size acquirer 111 acquires a size of the loading space, namely, respective limit values of length, width, and height (S101). Further, the learning package information generator 112 generates test data (S102). The test data includes sizes of packages and an order of the packages. For example, sizes of first to n-th packages are previously decided. A constant n is set to a number which is sufficiently large to the extent that all packages cannot be loaded in the loading space.

Further, the reinforcement learning based on the generated test data is executed, and learning of the loading state evaluation model proceeds (S103). A flow of the reinforcement learning will be described later. After the termination of the learning based on the test data, when a termination condition of the learning is not satisfied (NO in S104), the processing returns to S102, in which new test data is generated and learning is performed again. When the termination condition of the learning is satisfied (YES in S104), the model generation processing is terminated. The termination condition of the learning may be appropriately determined based on the number of times at which the parameter of the loading state evaluation model is updated, or the like.

Figure 5:
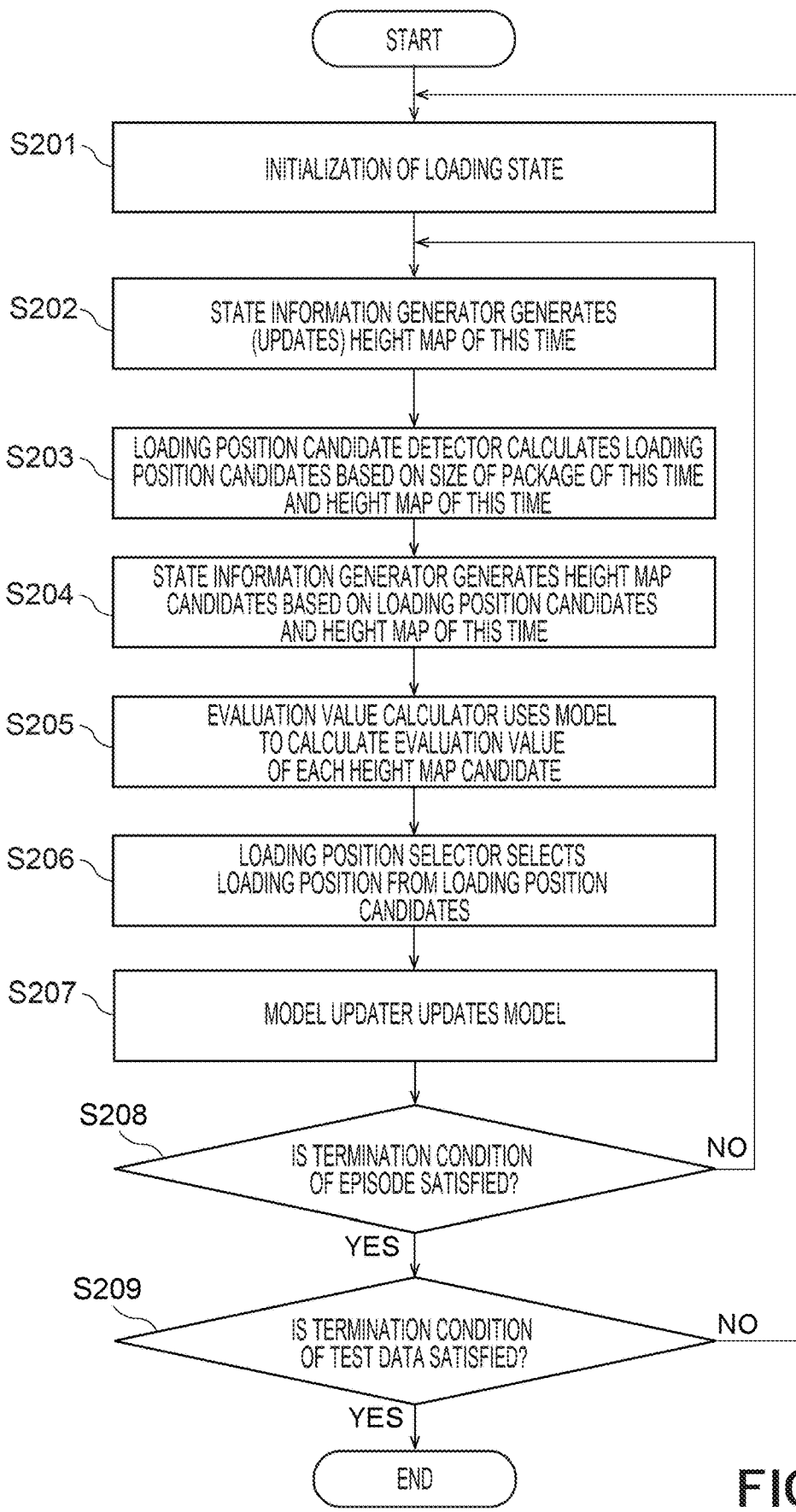
FIG. 5 is a schematic flow chart of reinforcement learning performed by the model generation processing device according to the first embodiment.

Next, a flow of the inside of the processing of S103 will be described. FIG. 5 is a schematic flow chart of the reinforcement learning performed by the model generation processing device 11 according to the first embodiment.

First, in order to start a new episode of the reinforcement learning, initialization of a loading state is performed (S201). The initialization means that a loading operation of package is started from an initial state where no package exists in the loading space. That is, after the initialization, decision processing of a loading position of a first package is started.

The state information generator 113 generates a height map of the loading space at the present moment (S202). The present moment may be any point of time from completion of loading of a previous package up to before loading of a package of this time. Further, the present moment in a case of loading a first package, may be any point of time from a start of operation up to before loading of the first package. In decision processing of a loading position of the first package, since there is created a state where none of packages is loaded, the height map is the same as a top view of the loading space. Further, in decision processing of a loading position of a k-th (k is an integer satisfying 1<k≤n) package, the state information generator 113 may set a height map candidate corresponding to a loading position decided in decision processing of a loading position of a k−1-th package, to a height map in the decision processing of the loading position of the k-th package.

Based on the size of the package to be loaded this time and the height map of this time updated in the processing of S202, the loading position candidate detector 114 detects loading position candidates (S203). The state information generator 113 generates, for each of the calculated loading position candidates, a height map when the package to be loaded this time is loaded at the calculated loading position candidate, namely, a height map candidate (S204).

The evaluation value calculator 116 uses the loading state evaluation model to calculate an evaluation value based on each height map candidate (S205). The loading position selector 117 selects one of the plurality of loading position candidates based on the policy (S206). Subsequently, the model updater 118 updates the model (S207). Note that depending on the method of the reinforcement learning, there may be a case where the processing of S207 is not performed every time a package is loaded. In that case, the processing of S207 is omitted. For example, it is also possible that S207 is omitted when loading positions of first to fourth packages are decided, and when a loading position of a fifth package is decided, the model is updated based on the loading positions of the first to fifth packages. Further, it is also possible that when the termination condition of the episode or the test data is satisfied, the model is updated based on a loading position of a package which is not used for updating the model.

Further, when the termination condition of the episode is not satisfied (NO in S208), the processing returns to S202, and processing with respect to a package to be loaded next is started. When the termination condition of the episode is satisfied (YES in S208) but the termination condition of the test data is not satisfied (NO in S209), the processing returns to the initialization of state (S201) for starting a new episode. When the termination condition of the episode is satisfied (YES in S208) and the termination condition of the test data is also satisfied (YES in S209), the reinforcement learning based on the test data is terminated. The termination condition of the episode may be set to, for example, a case where the evaluation value becomes less than the threshold value, since the evaluation value is reduced as packages are loaded (as the number of times of execution of the decision processing of the loading positions is increased). It is also possible to design such that the episode is terminated at a point of time at which it becomes impossible to load the next package. The termination condition with respect to the test data may be appropriately determined based on the number of times of execution of the episode, the filling rate at a point of time of termination of the episode, and so on.

Note that the flow chart in this explanation is one example, and is not limited to the above-described example. The rearrangement, addition, and omission of the procedure may be performed according to the specification, change, and so on required in the embodiment. For example, the acquisition of the size of the loading space and the generation of the test data may be processed concurrently. The same applies to the following flow charts.

Next, the loading position decision processing device 12 will be described. The loading space information acquirer 121 acquires information regarding a loading space. The information will be described as "loading space information", hereinafter. The loading space information includes at least a size of the loading space. Other than the above, the loading space information may also include information regarding a position of an already-loaded package. This is because the loading position decision processing device 12 can designate a loading position of the next package even from a state where there exists a package in the loading space. The loading space information may be acquired from a user via an input interface included in the model generation processing device 11, or it may also be acquired from an external device.

The loading package information acquirer 122 acquires information regarding a package to be loaded. The information will be described as "loading package information", hereinafter, to thereby distinguish it from the leaning package information. The loading package information includes a size of a package to be loaded this time.

Note that the loading package information may include sizes of a plurality of packages as long as it includes an identifier indicating a loading order. The loading package information may also be acquired from a user via an input interface included in the model generation processing device 11, or it may also be acquired from an external device.

The state information generator 123 of the loading position decision processing device 12 may be the same as the state information generator 113 of the model generation processing device 11, and it generates a height map and a height map candidate corresponding to a loading position candidate.

The state information generator 123 of the loading position decision processing device 12 may generate a height map from an image in the loading space. It is only required to use a method such as triangulation, or publicly-known measurement software capable of calculating a height from an image by using a stereo camera. That is, it is also possible that the image in the loading space is included in the loading space information as information regarding a position of an already-loaded package. Alternatively, it is also possible that, for example, information regarding a height of an already-loaded package is acquired by a depth camera or the like, and the information is transmitted to the state information generator 123. Further, the information may be used as test data for generating the loading state evaluation model in the model generation device.

The loading position candidate detector 124 of the loading position decision processing device 12 may be the same as the loading position candidate detector 114 of the model generation processing device 11, and it calculates a position at which the next package can be loaded, by using the height map.

The model storage device 125 of the loading position decision processing device 12 acquires the learned loading state evaluation model from the model generation processing device 11, and stores the model. Note that it is possible that the model storage device 125 of the loading position decision processing device 12 stores a plurality of loading state evaluation models with different corresponding loading spaces, and transmits, when the loading space is designated, the loading state evaluation model corresponding to the designated loading space.

The evaluation value calculator 126 of the loading position decision processing device 12 uses the loading state evaluation model stored in the model storage device 125 as a program module being a part of software, and calculates an evaluation value for each height map candidate. The evaluation value calculator 126 may be the same as the evaluation value calculator 116 of the model generation processing device 11.

Note that when a plurality of loading state evaluation models are stored in the model storage device 115, the evaluation value calculator 116 extracts, out the plurality of loading state evaluation models, the loading state evaluation model corresponding to the loading space related to the loading space information acquired by the loading space information acquirer 121, from the model storage device 115, based on the size of the loading space, the identifier of the loading space, and so on. Therefore, the identifier of the loading space may also be included in the loading space information.

The loading position decider 127 of the loading position decision processing device 12 decides, out of the loading position candidates, the loading position candidate with the highest evaluation value, as the loading position of the package to be loaded this time.

The loading position indicator 128 outputs (indicates) information related to the loading position to the output destination. The loading position may be represented by coordinates, or it may also be represented by an image such as a height map. The output destination is not particularly limited. For example, the loading position may be displayed on a display device such as a monitor in order to notify an operator of the loading position. Alternatively, by outputting a loading position to a control device such as a robot arm, it becomes possible to perform control such that the robot arm loads a package at the loading position. An actual loading operation can be supported in a manner as above.

Figure 6:
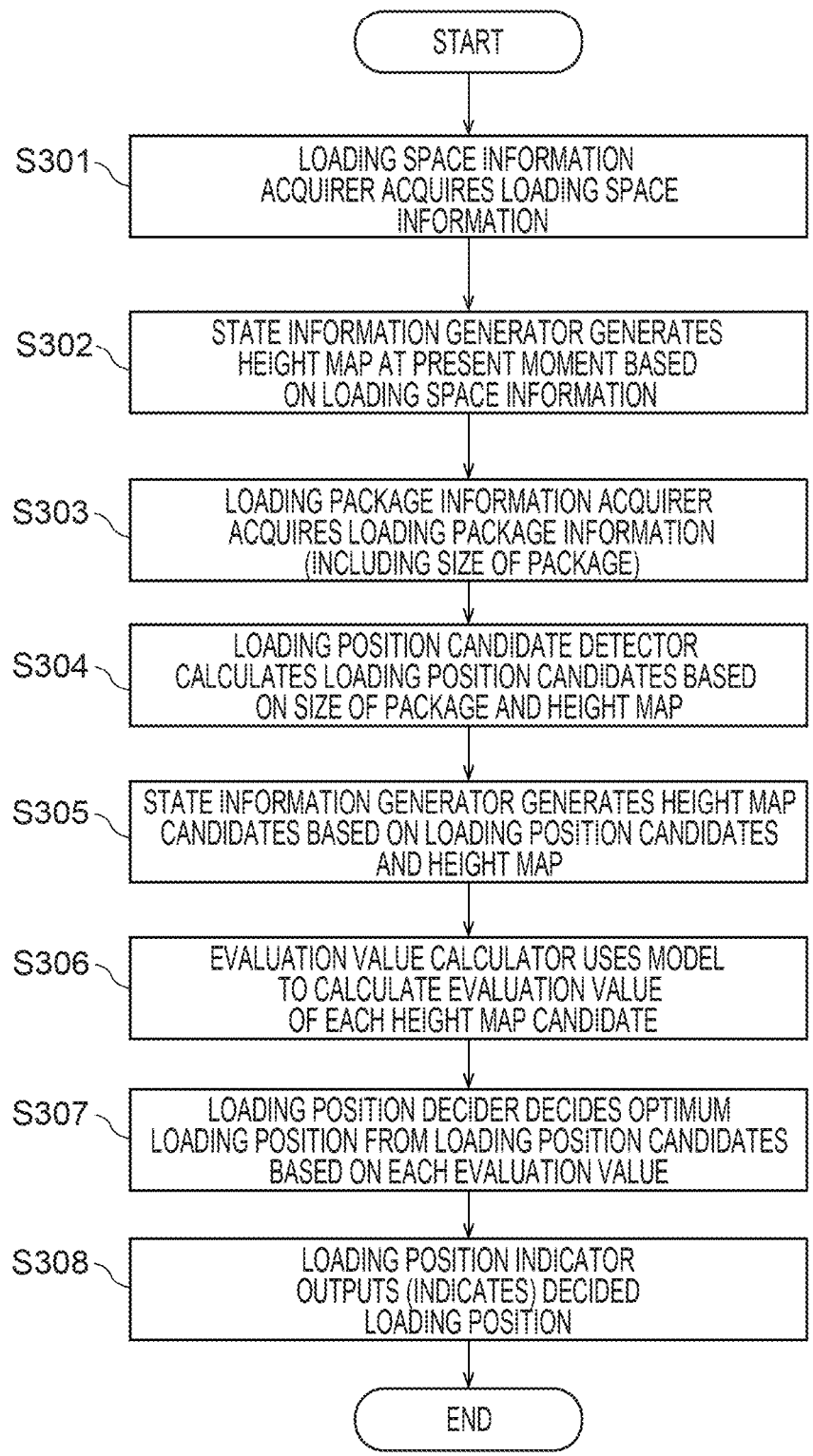
FIG. 6 is a schematic flow chart of processing performed by a loading position decision processing device according to the first embodiment.

Next, a flow of processing performed by the loading position decision processing device 12 will be described. FIG. 6 is a schematic flow chart of processing performed by the loading position decision processing device 12 according to the first embodiment.

The loading space information acquirer 121 acquires loading space information (S301), and the state information generator 123 generates a height map at the present moment based on the loading space information (S302). Meanwhile, the loading package information acquirer 122 acquires loading package information (S303).

Note that when the loading position is already designated, and a loading position for the next package is to be designated, a height map candidate related to the loading position decided with respect to the previous package may be cached to be used as a height map at the present moment. In that case, S301 may be omitted.

The loading position candidate detector 124 detects loading position candidates based on a size of a package to be loaded this time included in the loading package information, and the height map (S304). The state information generator 123 generates, for each of the calculated loading position candidates, a height map when the package of this time is loaded at the calculated loading position candidate, namely, a height map candidate (S305).

The evaluation value calculator 126 uses the loading state evaluation model to calculate an evaluation value of each height map candidate (S306). Further, the loading position decider decides the loading position candidate related to the height map candidate with the largest evaluation value as an optimum loading position (S307). Finally, the loading position indicator 128 outputs the decided loading position (S308), and the flow is terminated.

As described above, in the present embodiment, the loading position of the package is selected from one or more loadable positions, based on the evaluation value. Therefore, the loading position is not decided in a heuristic manner. For example, in a heuristic method, a package is put on a corner of a loading space, or the package is put on so as to be brought into contact with an already-loaded package with no space therebetween. However, such a thing does not happen in the present embodiment, and a first package may be put on the vicinity of a center of the loading space.

As described above, according to the present embodiment, the reinforcement learning using the height map is performed, to thereby generate the loading state evaluation model that evaluates the loading state. Further, by using the loading state evaluation model, the loading position is designated for each of the packages. Consequently, it is possible to perform an on-line response such that every time a package is arrived, the package is loaded at a proper position. Further, even in a state where packages are already loaded to some extent in the loading space, it is possible to start the support of package loading operation.

Second Embodiment

In the first embodiment, it is supposed that the packages are loaded in the order of arrival of the packages. The present embodiment supposes a case in which packages can be stored temporarily, or the like, and a case where arrived packages can be held without being loaded. For example, when a plurality of packages are arrived at about the same time in a case where there is a space in which a small number of packages can be stored temporarily, it can be considered that the packages do not always have to be loaded in the order of arrival. Further, it can be considered that the packages can be loaded more efficiently by changing the order of loading.

Figure 7:
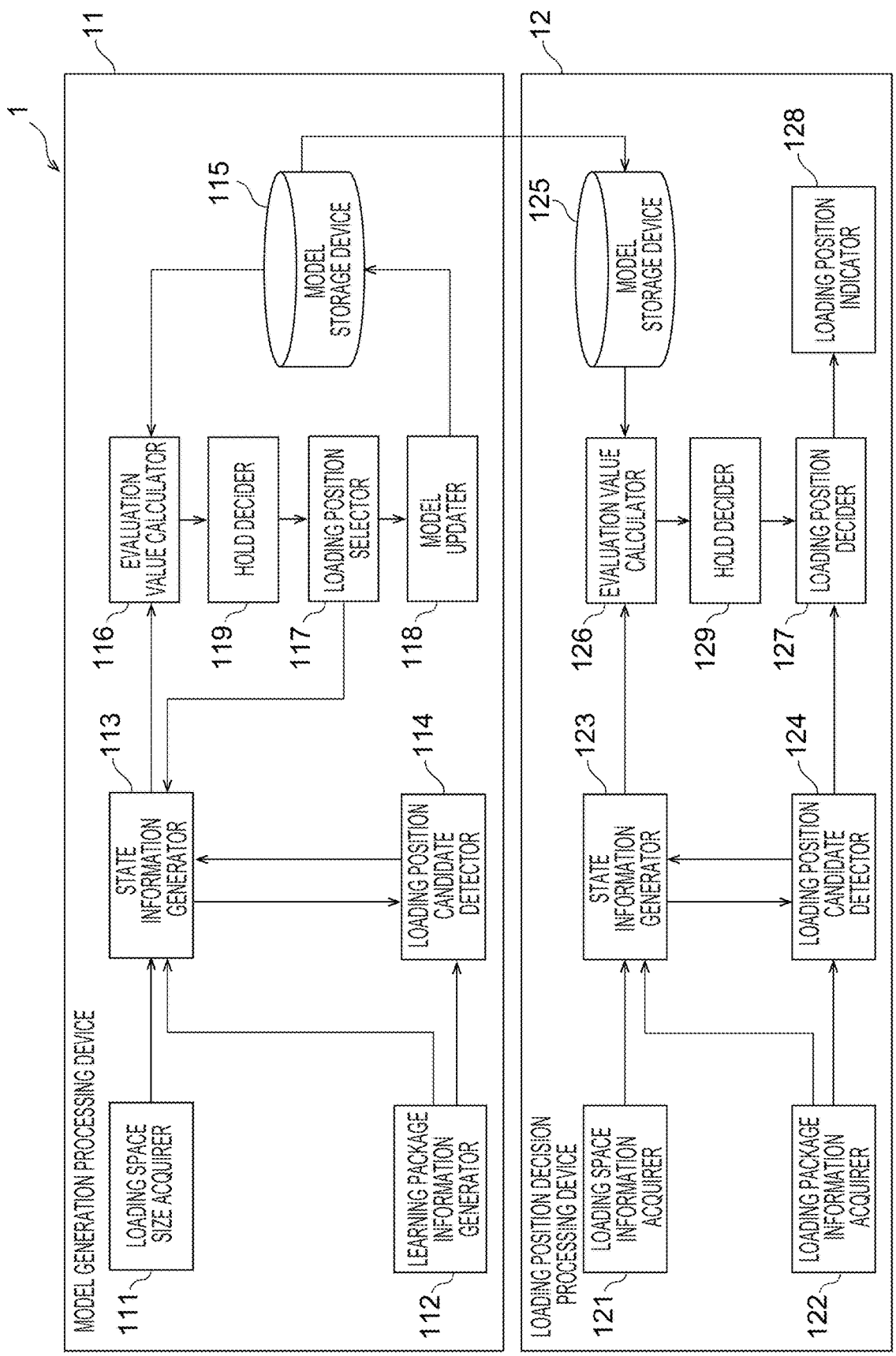
FIG. 7 is a block diagram illustrating one example of a loading operation support system according to a second embodiment.

FIG. 7 is a block diagram illustrating one example of a loading operation support system 1 according to the second embodiment. In the loading operation support system 1 according to the second embodiment, the model generation processing device 11 further includes a hold decider 119, and the loading position decision processing device 12 further includes a hold decider 129. The explanation regarding points similar to those of the first embodiment will be omitted.

Each of the loading position candidate detector 114 of the model generation processing device 11 and the loading position candidate detector 124 of the loading position decision processing device 12 detects loading position candidates with respect to not only a package given this time but also a package on hold, which is different from the first embodiment. The package on hold and the package given this time are candidates of package to be loaded this time, and the loading position candidate detector 114 of the present embodiment detects loading position candidates for each candidate of package to be loaded. The candidate of package to be loaded this time will be described as a "loading package candidate". A detection method of the loading position candidate is similar to that of the first embodiment.

Each of the hold decider 119 of the model generation processing device 11 and the hold decider 129 of the loading position decision processing device 12 decides whether or not the decision of loading position is put on hold. The decision may be made as "hold" when the evaluation values of all loading position candidates do not satisfy a condition by which the candidates are selected as the loading position.

For example, in a case where each value obtained by subtracting an evaluation value with respect to the height map candidate from the evaluation value of the height map at the present moment is a certain value or more, namely, when the evaluation regarding the loading state rapidly deteriorates, there is a high possibility that it is better not to load the package. Therefore, in such a case, the decision of loading position may be put on hold.

However, there may be a case where a package cannot be held, such as a case where a space for holding the package is filled. Therefore, a condition for judging whether a package can be held, is also defined. When a package cannot be held, a loading position is always decided.

The evaluation value calculator 116 of the model generation processing device 11 and the evaluation value calculator 126 of the loading position decision processing device 12 may be the same as those of the first embodiment. However, in the second embodiment, there may be a case where there are plural packages being loading package candidates. These packages may be equally selected based on the evaluation values based on the height map candidates, or a certain package may be preferentially selected. Alternatively, the evaluation value calculator 116 and the evaluation value calculator 126 may apply weighting for selecting a package to be loaded from plural packages, according to purposes. For example, it can be considered that a value of a function volume ($b_i$) that calculates a value according to a size of a package $b_i$ is added to an evaluation value obtained by the loading state evaluation model, and it is decided which package is to be loaded based on the evaluation value after the addition. The evaluation value to which volume ($b_i$) is added, is a value indicating a total capacity of packages, including that package, capable of being loaded from the present state, so that it becomes possible to compare mutual packages with different sizes.

For example, when it is set that a loading state evaluation model in a state $S(b_i,p_j)$ in which the package $b_i$ is loaded at a loading position candidate $p_j$, is represented by $V_M(S(b_i, p_j))$, the evaluation value calculator 116 and the evaluation value calculator 126 may set a value obtained by $V(S(b_i, p_j))$+volume ($b_i$) to the evaluation value. Consequently, it is possible to increase a possibility that a package with larger size or smaller size is loaded precedently.

Further, it can also be supposed a demerit such that by holding a package, an operation time and an operation labor are increased. Therefore, it is also possible to set that an action of holding a package is difficult to be selected. For example, it can be considered that the evaluation value calculator 116 and the evaluation value calculator 126 add a value of penalty function penalty ($b_i$) (penalty value) to an evaluation value obtained by the loading state evaluation model. That is, the evaluation value calculator 116 and the evaluation value calculator 126 may calculate a value obtained by $V(S(b_i,p_j))$+penalty ($b_i$) or $V(S(b_i,p_j))$+volume ($b_i$)+penalty ($b_i$), as an evaluation value. The penalty function penalty ($b_i$) is set to calculate a value of 0 or a negative value according to a package to be loaded. For example, the function is set to calculate a value of 0 with respect to a most-recently arrived package (a package which is not on hold), but calculate a negative value with respect to a held package. The negative value may be appropriately adjusted. By designing as above, a possibility of loading the most-recently arrived package (the package which is not on hold) is increased. The evaluation value may be processed for the purpose of selecting a package to be loaded, or reducing packages to be held as described above, and a processing method is not limited to the above-described example.

Figure 8:
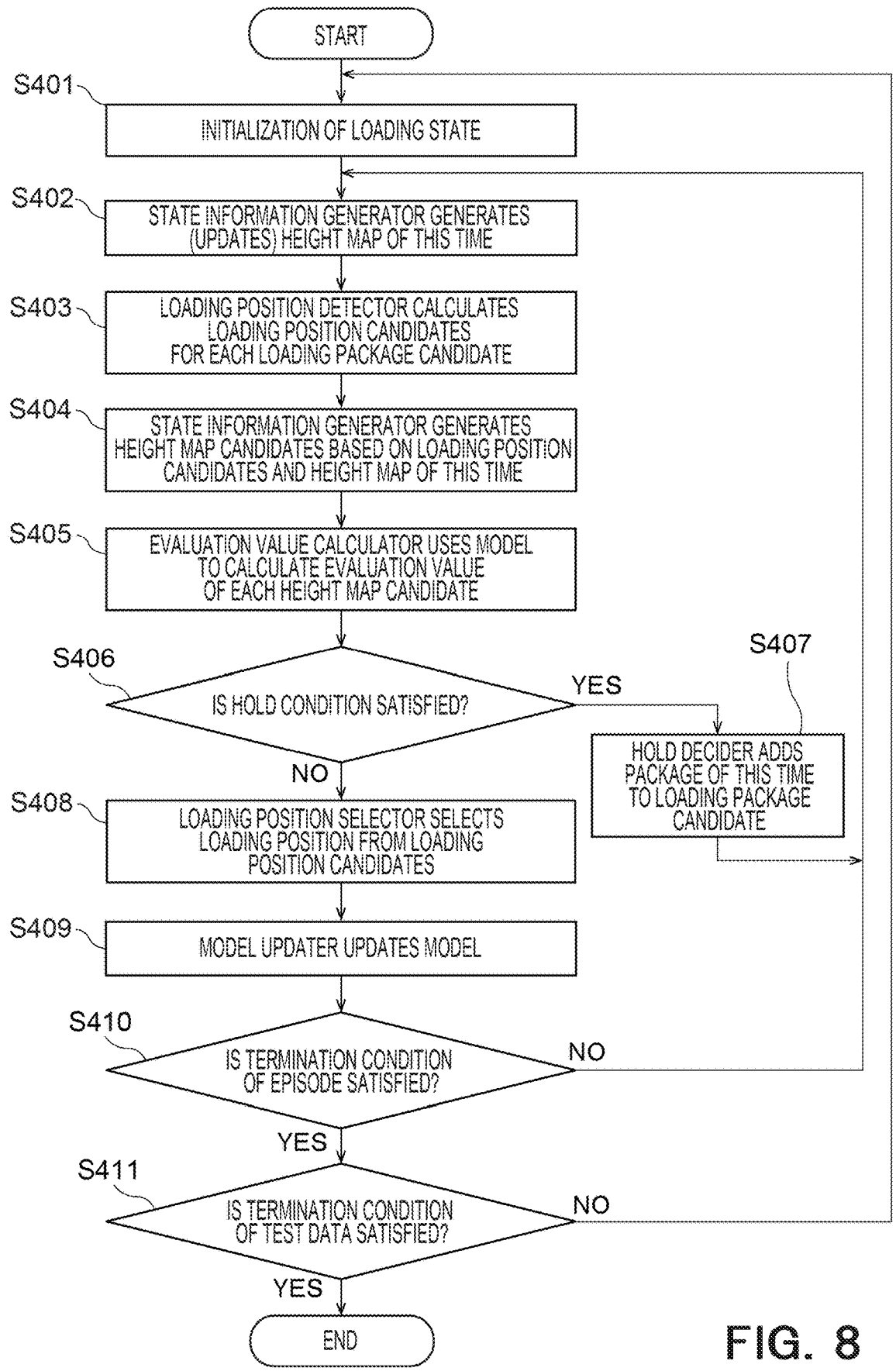
FIG. 8 is a schematic flow chart of reinforcement learning performed by a model generation processing device according to the second embodiment.

Next, a flow of processing in the second embodiment will be described. FIG. 8 is a schematic flow chart of reinforcement learning performed by the model generation processing device 11 according to the second embodiment. The processing of S401 and the processing of S402 are the same as the processing of S201 and the processing of S202, respectively, of the first embodiment. The processing of S403 is partially different from the processing of S203, in which the loading position candidate detector 114 detects loading position candidates for each package set as a loading package candidate (S403). Note that when the hold is selected in the decision processing of the loading position of the previous package, the loading package candidate of the package on hold is already detected, so that only the loading package candidate of the package of this time may be detected by omitting the detection of the loading package candidate of the package on hold.

The processing of S404 and the processing of S405 are the same as the processing of S204 and the processing of S205, respectively, of the first embodiment, in which an evaluation value of each height map candidate is calculated. When a hold condition such that the calculated evaluation value of the height map candidate exceeds a threshold value, and the number of packages on hold does not exceed an upper limit value, is satisfied (YES in S406), it is set that the hold is performed, and the loading position selector 117 adds the package given this time to the loading package candidate (S407). Further, the processing returns to S402, and decision processing of a loading position of the next package is started. When the hold condition is not satisfied (NO in S406), the loading position selector 117 selects a loading position from loading position candidates (S408), in a similar manner to S206 in the first embodiment. The processing and branches thereafter are the same as those of the first embodiment. Further, it is also possible that the processing of S409 regarding the model update is not performed every time a package is loaded but is performed collectively with respect to plural packages, similarly to the processing of S207 of the first embodiment.

Figure 9:
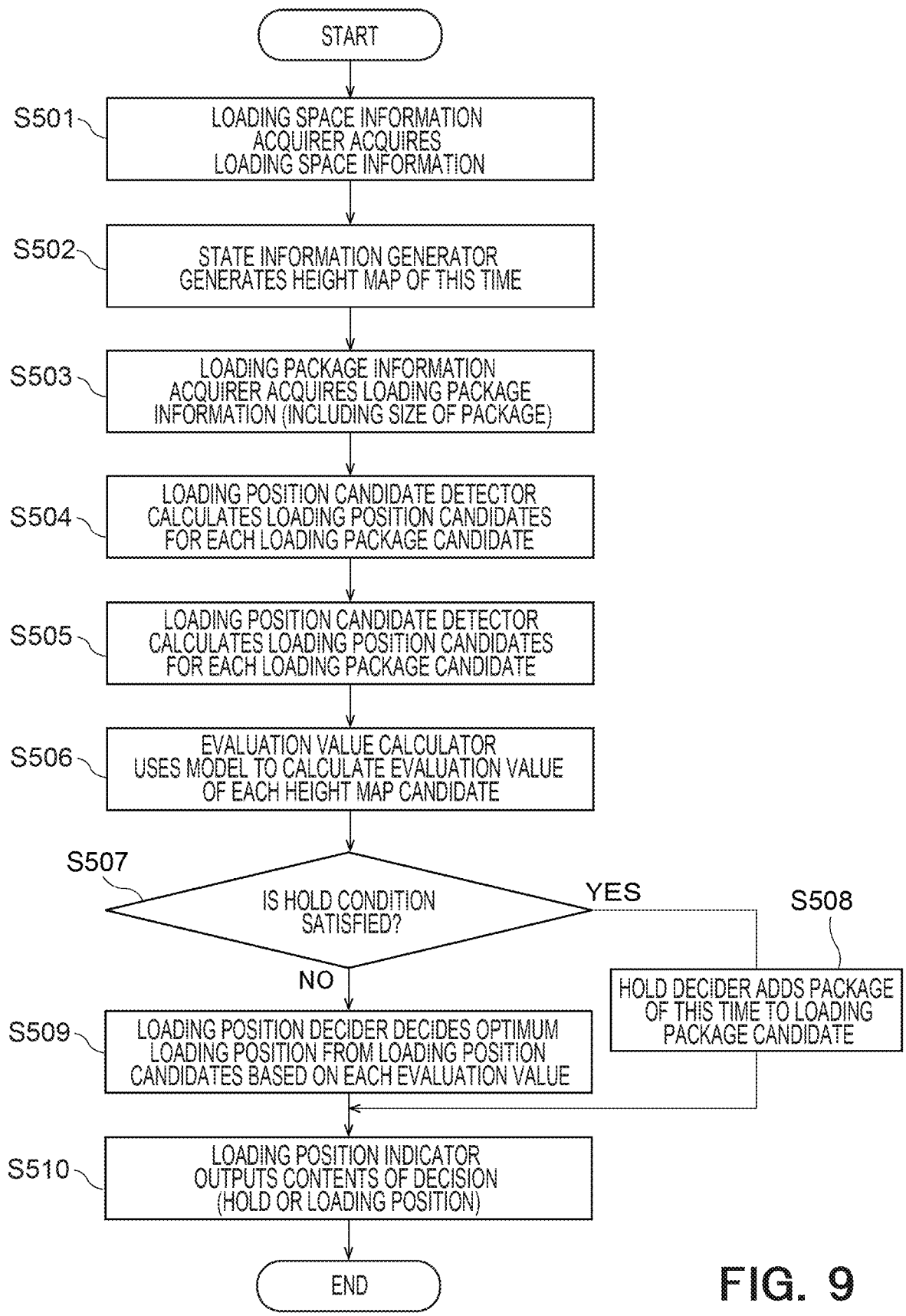
FIG. 9 is a schematic flow chart of processing performed by a loading position decision processing device according to the second embodiment.

FIG. 9 is a schematic flow chart of the processing of the loading position decision processing device 12 according to the second embodiment. The processing from S501 to S503 is similar to that from S301 to S303 of the first embodiment. The processing of S504 is partially different from the processing of S304, in which the loading position candidate detector 124 detects loading position candidates for each loading package candidate (S403).

The processing of S505 and the processing of S506 are the same as the processing of S305 and the processing of S306, respectively, of the first embodiment, and an evaluation value of each height map candidate is calculated. When the calculated evaluation value of the height map candidate satisfies the hold condition (YES in S507), it is set that the hold is performed, and the loading position decider 127 does not decide the loading position and adds the package given this time to the loading package candidate (S508). When the hold condition is not satisfied (NO in S406), the loading position decider decides a loading position (S509), similarly to the first embodiment. Subsequently, the loading position indicator 128 outputs contents of decision, namely, the hold or the loading position (S510).

Figure 10:
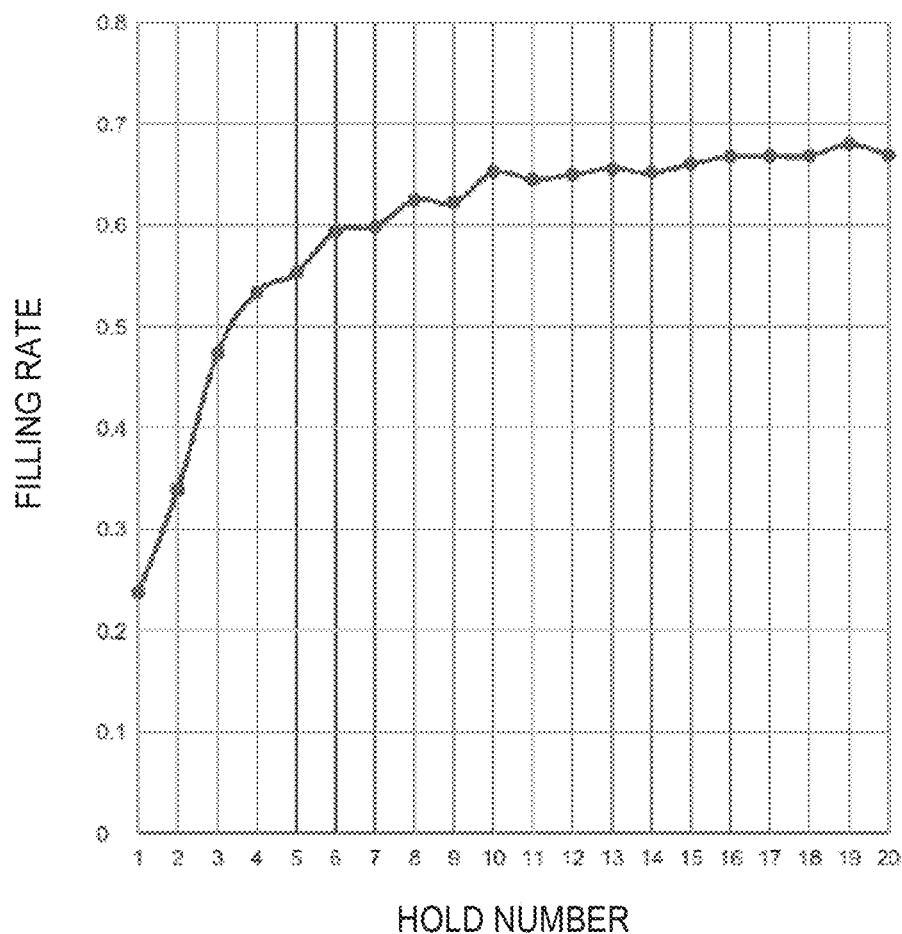
FIG. 10 is a diagram illustrating a relation between a hold number and a filling rate.

FIG. 10 is a diagram exemplifying a relation between a hold number and a filling rate. A horizontal axis indicates a maximum holdable number, and a vertical axis indicates a final filling rate of a loading space. Although a shape of the graph of FIG. 10 changes as a matter of course depending on a distribution of sizes of packages, a size of the loading space, and so on, the filling rate tends to be improved as the hold number increases from 0. Therefore, it can be understood that when the performance of hold is possible, packages can be loaded efficiently. Further, the filling rate does not improve so much even if the hold number is increased to 10 or more, so that it can be understood that the hold number is only required to be a certain number.

As described above, according to the present embodiment, since the performance of hold is possible, the final filling rate of the loading space can be improved. Further, a sufficient effect is provided even if the hold number is only about several number, and thus there is no need to put all packages on hold. Further, it is also possible to perform adjustment such that the hold is performed as less as possible, and thus the increase in operation time and labor due to the hold can be prevented.

Third Embodiment

In the embodiments described so far, there is sometimes created a state where packages are finally piled up in a staircase state. For example, when a region surrounded by a dotted line frame at lower left of the height map illustrated in FIG. 2 is seen, the depth of color is sequentially reduced from the left toward the right. This indicates that packages are loaded in a staircase state. In such a loading state, if the loading space is a truck bed, for example, there is a high risk of collapse of packages due to horizontal vibration. As described above, there is also a case where stability of package is regarded as important due to circumstances of the loading space and the like. Accordingly, in the third embodiment, the loading state is not evaluated only by the filling rate, and the stability of package is also taken into consideration. The explanation regarding points similar to those of the first embodiment will be omitted.

The configuration of the third embodiment is similar to that of the first or the second embodiment. Therefore, FIG. 1 or FIG. 8 is also a schematic configuration diagram of the third embodiment. The explanation regarding points similar to those of the first embodiment will be omitted.

By experiments conducted by the inventors, it was clarified that when the threshold value related to the bottom surface contact ratio is high, packages are likely to be loaded in a staircase state consequently. Accordingly, in the third embodiment, the condition regarding the decision of loading position candidate is relaxed, and there is provided a condition such that the loading can be performed even when the condition regarding the bottom surface contact ratio is not satisfied. Concretely, a position at which a side surface which does not intersect a contact region of a bottom surface is brought into contact with a sidewall of the loading space or another package, is allowed as the loading position candidate. Note that it is also possible to design such that not all of positions at which the side surface is brought into contact are allowed but a position at which a contact ratio of the side surface (area of contact region of side surface/area of entire side surface) exceeds a threshold value, is allowed as the loading position candidate.

Alternatively, it is also possible to design such that even when the condition regarding the bottom surface contact ratio is not satisfied, a position at which the side surface which does not intersect the contact region of the bottom surface is brought into contact with the sidewall of the loading space directly or via another package, is allowed as the loading position candidate.

Figures 11A, 11B:
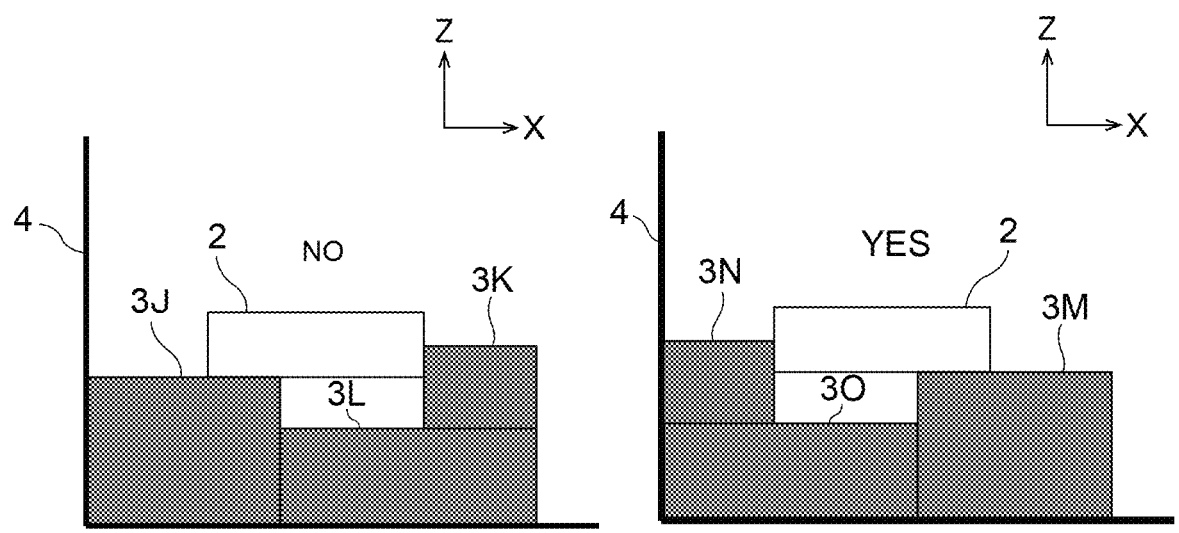
FIGS. 11A and 11B are diagrams explaining yes/no of detection of loading position candidates based on a side-surface contact.

FIGS. 11A and 11B are diagrams explaining yes/no of detection of loading position candidates based on a side-surface contact. FIG. 11 illustrates positional relationships between a package 2 to be loaded and already-loaded packages 3 (3J to 3O). Further, whether or not a position is detected as the loading position candidate, is indicated by YES or NO.

In FIG. 11(A), although a bottom surface contact ratio between the package 2 and the package 33 is small, the package 2 is brought into contact with the package 3K at a side surface which does not intersect a contact region of the bottom surface. However, the package 3K is not brought into contact with a sidewall 4 of the loading space. In such a case, when the loading space is horizontally vibrated, there is a fear that the package 3N and the package 2 collapse in the right direction. Therefore, the position of the package 2 in FIG. 11 (A) is not detected as the loading position candidate.

On the other hand, in FIG. 11(B), although a bottom surface contact ratio between the package 2 and the package 3M is small, the package 2 is brought into contact with the package 3N at a side surface which does not intersect a contact region of the bottom surface. Further, the package 3N is brought into contact with the sidewall 4 of the loading space. In such a case, even if the loading space is horizontally vibrated, the package 3N is supported by the sidewall 4 and thus the package is unlikely to be collapsed. Therefore, the position of the package 2 in FIG. 11(B) may be detected as the loading position candidate.

Further, the model generation processing device 11 of the third embodiment may generate the loading state evaluation model so as to calculate an evaluation value to which the stability of the loading state of package is added. For example, although the loading state evaluation model of the embodiments described so far sets the height map candidate as the input information, it can be considered to generate the loading state evaluation model by adding information indicating the stability of the loading state of package to the input information. Alternatively, it is also possible to generate a model that calculates an evaluation value with respect to the stability from the information indicating the stability of the loading state of package, separately from the loading state evaluation model of the embodiments described so far. In this case, the evaluation value calculator calculates the evaluation value based on the sum of the evaluation value of the loading state evaluation model and the evaluation value of the model that calculates the evaluation value with respect to the stability.

As the information indicating the stability of the loading state of package, there can be considered a level difference map obtained by processing the height map. For example, the total sum of logical values representing comparison of height between each section of the height map and adjacent each section is calculated. It can be considered that the logical value is set to 1 when the height of the section is higher than that of the adjacent section, the logical value is set to 0 when the heights are the same, and the logical value is set to −1 when the height of the section is lower than that of the adjacent section, for example. Consequently, an absolute value of the total sum indicates a difference in height among adjacent sections. Here, the total sum is defined as a "level difference", and information indicating the level difference in respective sections of the entire loaded packages is described as a "level difference map". It can be considered that when the level difference of the section is close to 0, the number of packages whose side surfaces can be brought into contact with each other is increased, and thus the stability is increased. Therefore, the level difference map can be considered as information indicating the stability of the loading state of package. The reinforcement learning in which this level difference map is further added to the input information of the loading state evaluation model, and a large reward can be obtained finally even when the height in the respective sections is uniform, is performed. Consequently, it is set that the loading state evaluation model highly evaluates a loading state which is suitable for increasing the filling rate of packages in a predetermined space and uniformizing the height in the respective sections.

When the level difference map is used, the state information generator 113 and the state information generator 123 are only required to generate the height map, and then generate the level difference map from the height map. Further, the state information generator 113 and the state information generator 123 generate level difference map candidates together with the height map candidates, in a similar manner to the generation of the height map candidates. The evaluation value calculator 116 and the evaluation value calculator 126 input the generated level difference map candidates, together with the height map candidates, in the loading state evaluation model, to thereby acquire evaluation values. The points other than the above are similar to those of the embodiments described so far.

The level difference map may be image data such as a heat map, similarly to the height map, or it may also be represented as data in which information indicating positions of sections (a row number and a column number, for example) and the total sum of logical values in the sections are combined.

A flow when using the level difference map is omitted because "the height map" is only required to be replaced with "the height map and the level difference map", and "the height map candidate" is only required to be replaced with "the height map candidate and the level difference map candidate" in the flow of the first or the second embodiment.

Figure 12:
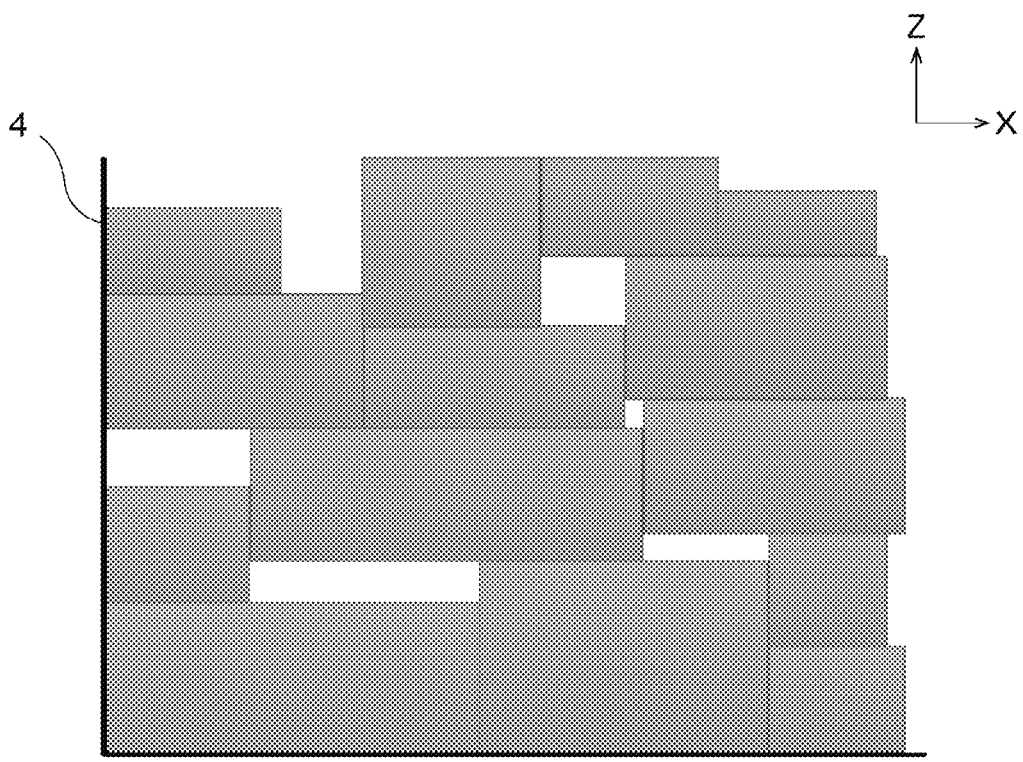
FIG. 12 is a conceptual diagram illustrating results when packages are continuously loaded in accordance with designation made by a loading position decision processing device according to a third embodiment.

FIG. 12 is a conceptual diagram illustrating results when packages are continuously loaded in accordance with designation made by the loading position decision processing device according to the third embodiment. It can be understood that packages are not piled up in a staircase state, and the stability is increased.

As described above, according to the present embodiment, by taking the contact of the side surface into consideration, and further, by calculating the evaluation value which takes not only the filling rate but also the stability into consideration by using the level difference map, it becomes possible to improve the stability of the loading state of package.

Fourth Embodiment

In the embodiments described so far, it is possible to limit the height, and thus it is possible to prevent packages from being loaded excessively high. However, depending on weight of the piled-up packages, there may be a case where a lower-side package is crushed due to weight of an upper-side package before reaching a limit value of height. Therefore, the fourth embodiment makes it possible to prevent a situation where the lower-side package is crushed due to the weight of the upper-side package. The explanation regarding points similar to those of the first embodiment will be omitted.

The configuration of the fourth embodiment is similar to that of the embodiments described so far. Therefore, FIG. 1 or FIG. 7 is also a schematic configuration diagram of the fourth embodiment. The explanation regarding points similar to those of the embodiments described so far will be omitted.

In the fourth embodiment, the learning package information and the loading package information further include weight of package. Further, the learning package information generator 112 further decides the weight of package, together with the size of package, as test data.

Note that although the weight is employed in this explanation, it is possible to consider based on density, not the weight. In that case, the weight is only required to be replaced with density in this explanation.

In the fourth embodiment, the state information generator 113 and the state information generator 123 generate information indicating the weight of the entire packages in respective sections set in the predetermined space, similarly to the generation of height map except that the weight of package is used instead of the height of package. The information will be described as a "weight map".

The reinforcement learning in which this weight map is further added as the input information, and a large reward can be obtained finally even when the weight in the respective sections is uniform, is performed. Consequently, it is set that the loading state evaluation model highly evaluates a loading state which is suitable for increasing the filling rate of packages in the predetermined space and uniformizing the height in the respective sections.

The state information generator 113 and the state information generator 123 generate weight map candidates with respect to loading position candidates based on the loading position candidates and the weight map, together with the height map candidates, in a similar manner to the generation of the height map candidates.

In the fourth embodiment, the loading position candidate detector 114 and the loading position candidate detector 124 detect loading position candidates based on the height map and the weight map. In the embodiments described so far, it is set that the height of each section does not exceed an upper limit value corresponding thereto when packages are loaded, but, in the present embodiment, it is further set that the weight of each section (the total weight of packages in each section) does not exceed an upper limit value corresponding thereto.

Alternatively, it is also possible to provide, for each package, an upper limit value of the total weight of packages loaded on top of the package. Note that the upper limit value of the total weight of packages loaded on a package may be different for each package, according to a size or the like of the package. For example, it can be considered that the upper limit value is increased with respect to a package with high density, and the upper limit value is reduced with respect to a package with low density. Alternatively, it is also possible to provide an upper limit value of a value obtained by dividing the total weight of packages loaded on a package by an area of an upper surface of the package, namely, an upper limit value of pressure applied to an upper surface of the package.

The evaluation value calculator 116 and the evaluation value calculator 126 of the fourth embodiment input the generated weight map candidates, together with the height map candidates, in the loading state evaluation model, to thereby acquire evaluation values. Consequently, the loading state evaluation model of the fourth embodiment generates evaluation values in which the weight in the section is taken into consideration. Note that it is also possible to generate, separately from the loading state evaluation model in the embodiments described so far, a model of calculating an evaluation value based on the weight map candidates, to thereby generate a new loading state evaluation model obtained by adding the model and the loading state evaluation model in the embodiments described so far. The points other than the above are similar to those of the embodiments described so far.

The weight map may be image data, similarly to the height map, or it may also be represented as data in which information indicating positions of sections (a row number and a column number, for example) and the total weight of packages in the sections are combined.

A flow of the present embodiment will be omitted since "the height map" is only required to be replaced with "the height map and the weight map", and "the height map candidate" is only required to be replaced with "the height map candidate and the weight map candidate".

As described above, according to the present embodiment, by calculating the evaluation value which takes not only the filling rate but also the weight in each section into consideration by using the weight map, it is possible to prevent a situation where a lower-side package is crushed due to weight of an upper-side package.

In the above-described embodiments, the state information generator 113 uses, as one example of state information regarding the loading state of package in the loading space, "the height map" indicating the height of package with respect to the bottom surface, but, it is also possible to use another information. For example, when an upper surface of the loading space is blocked and only a part of side surface is opened, it is possible to use information regarding a depth of the entire packages by setting an opening surface as a reference, as state information. That is, a height map with respect to an opposing surface of the opening surface, in other words, a depth map may be used. In this case, it is also possible that the loading position candidate detector 114 sets a position at which a contact ratio of a side surface and a bottom surface on the opposing surface side of a package is a threshold value or more, as a loading position candidate, and the state information generator 113 generates, when the loading position candidates are transmitted thereto from the loading position candidate detector 114, information regarding the depth when the package is assumed to be loaded at any of the loading position candidates (depth map candidates), for each loading position candidate. The depth map and the depth map candidate may be a heat map in which the degree of depth with the opening surface set as a reference is expressed by a color gradation, similarly to the height map and the height map candidate, or it may also be data in which information indicating positions of sections and depth of packages in the sections are combined. The evaluation value calculator 126 uses the loading state evaluation model to calculate an evaluation value of information regarding the depth for each loading position candidate. For the evaluation value, it is also possible to use information regarding the filling rate of packages and the total capacity of loadable objects in the loading section. As above, it is possible to generate and use not only the height map with respect to the bottom surface of the loading space but also the height map with respect to the side surface of the loading space.

In the above-described embodiments, the loading position candidate detector 114 detects the loading position candidate by using the contact ratio of the bottom surface or the like, but, it may decide the loading position candidate by using another information. For example, it is possible to perform control such that when strength of an already-loaded object is low, and it is not possible to load an object on an upper surface of the already-loaded object, the upper surface of the object is not detected as a loading position candidate. Further, it is also possible to decide a loading position candidate according to weight of an object to be a loading target. As described above, the loading position candidate detector 114 may decide the loading position according to properties (strength, weight, and so on) of each object.

Note that at least a part of the above-described embodiments may be implemented by a specialized electronic circuitry (namely, hardware) such as IC (Integrated Circuit) implemented with a processor, a memory, and so on. A plurality of constituent elements may be implemented by one electronic circuitry, one constituent element may be implemented by a plurality of electronic circuitries, or each of the constituent elements is implemented by one electronic circuitry. Further, at least a part of the above-described embodiments may be implemented through the execution of software (program). For example, it is possible to implement the processing of the above-described embodiments by, for example, using a general-purpose computer device as basic hardware and causing a processor (Processing circuit, Processing circuitry) such as CPU (Central Processing Unit) and GPU (Graphics Processing Unit) mounted in the computer device to execute the program. In other words, the processor (Processing circuit, Processing circuitry) is configured to be capable of executing the processing of each of the devices by executing the program.

For example, by a computer reading specialized software stored in a computer-readable storage medium, it is possible for the computer to be the device of the above-described embodiments. The kind of the storage medium is not limited in particular. Besides, by a computer installing specialized software downloaded through a communication network, it is possible for the computer to be the device of the above-described embodiments. In this manner, information processing by the software is concretely implemented using a hardware resource.

Figure 13:
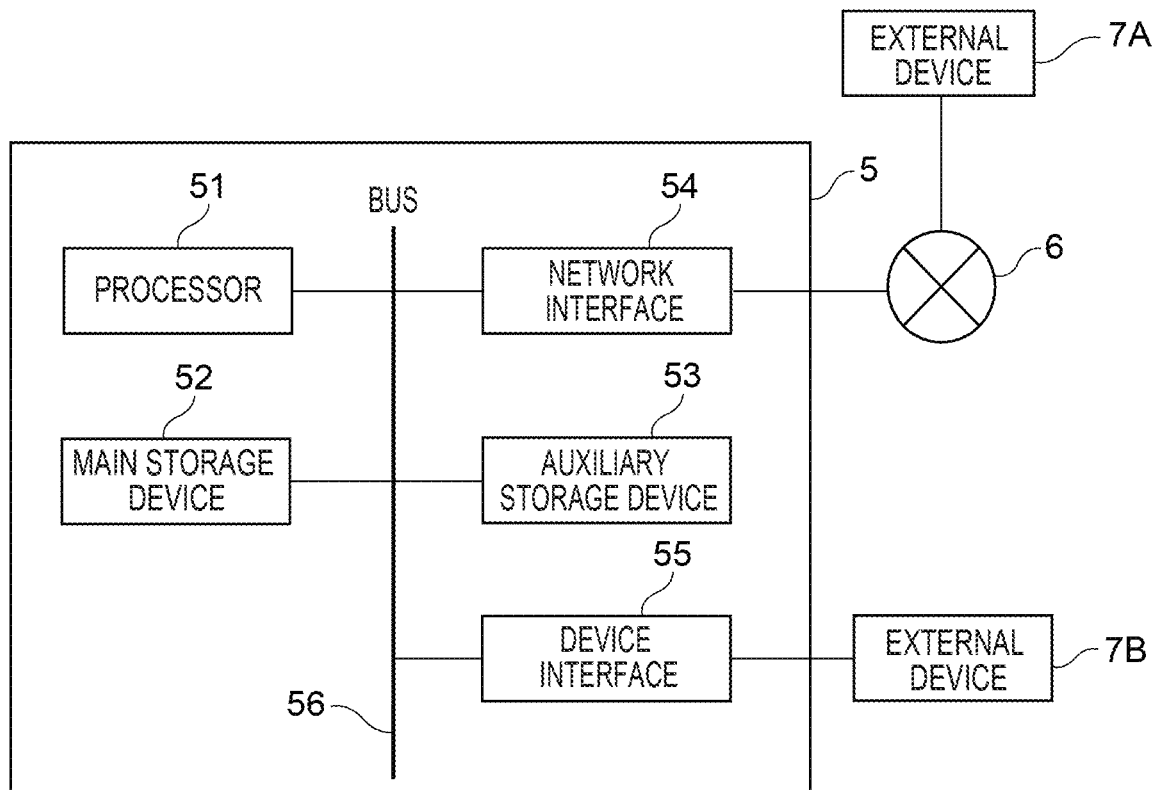
FIG. 13 is a block diagram illustrating one example of a hardware configuration in one embodiment of the present invention.

FIG. 13 is a block diagram illustrating an example of the hardware configuration in one embodiment of the present invention. Each device of the operation support system includes a processor 51, a main storage device 52, an auxiliary storage device 53, a network interface 54, and a device interface 55, and can be implemented as a computer device 5 in which they are connected through a bus 56.

It should be noted that the computer device 5 may include a plurality of the same constituent elements though the number of each of the constituent elements included in the computer device 5 in FIG. 13 is one. Further, the single computer device 5 is illustrated in FIG. 13, but, the software may be installed in a plurality of computer devices and the plurality of computer devices may execute different parts of the processing of the software.

The processor 51 is an electronic circuitry (processing circuitry) including a computer control unit and an arithmetic unit. The processor 51 performs the arithmetic processing on the basis of data and program input from respective devices and so on of the internal configuration of the computer device 5, and outputs the arithmetic results and control signals to the respective devices and so on. Concretely, the processor 51 executes OS (Operating System) of the computer device 5, application, and so on to control the respective constituent elements included in the computer device 5. The processor 51 is not limited in particular, provided that it is capable of performing the above-described processing. It is supposed that the constituent elements of the model generation processing device 11 and the loading position decision processing device 12 except for the model storage device 115 and the model storage device 125 are implemented by the processor 51. Further, the processor 51 functions in a manner that when it reads the loading state evaluation model, it outputs the output information such as the evaluation value from the input information stored in the main storage device 52 or the auxiliary storage device 53.

The main storage device 52 is a storage device storing instructions which are to be executed by the processor 51, various kinds of data, and so on, and information stored in the main storage device 52 is read directly by the processor 51. The auxiliary storage device 53 is a storage device other than the main storage device 52. Note that these storage devices mean any electronic components capable of storing electronic information and may be memories or storages. Further, a memory includes a volatile memory and a non-volatile memory, and the memories may be either of these. The model storage device 115 may be implemented by the main storage device 52 or the auxiliary storage device 53. That is, the model storage device 115 may be a memory or a storage.

The network interface 54 is an interface for wireless or wired connection to a communication network 6. As the network interface 54, one conforming to an existing communication protocol may be used. The network interface 54 enables the connection of the computer device 5 and an external device 7A through the communication network 6.

The device interface 55 is an interface such as USB which directly connects to an external device 7B. That is, the computer device 5 and the external device 7 may be connected through a network or directly.

It should be noted that the external device 7 (7A and 7B) may be any of a device outside the loading operation support system 1, a device inside the loading operation support system 1, an external storage medium, and a storage device.

While certain embodiments of the present invention have been described above, these embodiments have been presented by way of example, and are not intended to limit the scope of the inventions. These novel embodiments may be embodied in a variety of other forms, and various omissions, substitutions, and changes may be made therein without departing from the spirit of the inventions. Such forms or modifications fall within the scope and spirit of the inventions and are covered by the inventions set forth in the claims and their equivalents.

The invention claimed is:

1. An information processing system, comprising:
at least one memory; and
at least one processing circuitry, wherein
the at least one processing circuitry is configured to execute:
generating loading state information regarding an object loading state of a predetermined space where a plurality of objects will be loaded, under an assumption that a first object to be loaded is loaded at a loading position candidate in the predetermined space; and
inputting the loading state information into a loading state evaluation model that outputs, when the loading state information is input therein, an evaluation value with respect to the object loading state of the predetermined space, and acquiring the evaluation value.

2. The information processing system according to claim 1, wherein the loading position candidate include a position where the first object will be loaded on each of two or more objects in the predetermined space.

3. The information processing system according to claim 1, wherein the at least one processing circuitry is configured to execute detecting the loading position candidate of the first object in the predetermined space using three lengths in vertical, horizontal, and height directions of the first object.

4. The information processing system according to claim 1, wherein
the evaluation value with respect to the object loading state of the object is a value regarding a capacity of the object in the predetermined space.

5. The information processing system according to claim 1, wherein
the at least one processing circuitry is configured to further execute deciding a loading position of the first object from the plurality of loading position candidates, based on the acquired evaluation value.

6. The information processing system according to claim 1, wherein
the at least one processing circuitry is configured to further execute detecting positions at which the first object can be loaded in the predetermined space, as the plurality of loading position candidates, by using information regarding the first object and loading state information at a first point of time before loading the first object.

7. The information processing system according to claim 1, wherein
the at least one processing circuitry is configured to further execute deciding whether or not to load the first object into the predetermined space immediately, based on the acquired evaluation value.

8. The information processing system according to claim 7, wherein
when the decision of the loading position of the first object is put on hold, the at least one processing circuitry is configured to further execute:
generating loading state information under an assumption that a second object to be loaded is loaded at any of a plurality of loading position candidates;
acquiring an evaluation value with respect to the loading state information generated for the second object, by using the loading state evaluation model; and
deciding either the loading position of the first object or a loading position of the second object, based on the evaluation value with respect to the loading state information of the first object and the evaluation value with respect to the loading state information of the second object.

9. The information processing system according to claim 8, wherein
the at least one processing circuitry is configured to further execute updating the evaluation value with respect to the loading state information of the first object by using a penalty value.

10. The information processing system according to claim 6, wherein
the at least one processing circuitry is configured to further execute detecting at least either a position at which a ratio of a contact region at a bottom surface of the first object to the bottom surface is a threshold value or more, or a position at which the ratio of the contact region to the bottom surface is less than the threshold value but a side surface of the first object that does not intersect the contact region is brought into contact with a sidewall of the predetermined space directly or via another object, as a loading position candidate of the first object.

11. The information processing system according to claim 1, wherein
the loading state information includes information regarding a height of loaded objects in the predetermined space.

12. The information processing system according to claim 11, wherein
the loading state evaluation model is learned to increase the evaluation value when the object loading state related to the input loading state information is suitable for increasing a filling rate of objects in the predetermined space and uniformizing the height of the loaded objects in the predetermined space.

13. The information processing system according to claim 1, wherein
the loading state information includes information regarding weight of the entire loaded objects in respective sections set in the predetermined space.

14. The information processing system according to claim 12, wherein
the loading state evaluation model is learned to increase the evaluation value when the object loading state related to the input loading state information is suitable for increasing a filling rate of objects in the predetermined space and uniformizing the weight of the entire loaded objects in the respective sections set in the predetermined space.

15. The information processing system according to claim 1, wherein
the loading state evaluation model is a neural network which outputs the evaluation value based on the loading state information.

16. A model generation processing system, comprising:
at least one memory; and
at least one processing circuitry, wherein
the at least one processing circuitry is configured to execute:
generating loading state information under an assumption that an object is loaded at a loading position candidate in a predetermined space where a plurality of objects will be loaded;
acquiring an evaluation value with respect to the generated loading state information by using a loading state evaluation model for deciding a loading position of the object in the predetermined space;
selecting one of a plurality of loading position candidates, as the loading position of the object, based on a predetermined policy; and
updating the loading state evaluation model by evaluating validity of the evaluation value related to the selected loading position.

17. An information processing method, comprising:
generating loading state information regarding an object loading state of a predetermined space where a plurality of objects will be loaded, under an assumption that a first object to be loaded is loaded at a loading position candidate in the predetermined space; and
inputting the loading state information into a loading state evaluation model that outputs, when the loading state information is input therein, an evaluation value with respect to the object loading state of the predetermined space, and acquiring the evaluation value.

18. The information processing method according to claim 17, wherein
the evaluation value with respect to the object loading state of the object is a value regarding a capacity of the object in the predetermined space.

19. The information processing method according to claim 17, further comprising
deciding a loading position of the first object from the plurality of loading position candidates, based on the acquired evaluation value.

20. The information processing method according to claim 17, further comprising
    detecting positions at which the first object can be loaded in the predetermined space, as the plurality of loading position candidates, by using information regarding the first object and loading state information at a first point of time before loading the first object.

21. The information processing method according to claim 17, further comprising
    deciding whether or not to load the first object into the predetermined space immediately, based on the acquired evaluation value.

22. The information processing method according to claim 21, further comprising, when the decision of the loading position of the first object is put on hold:
    generating loading state information under an assumption that a second object to be loaded is loaded at any of a plurality of loading position candidates;
    acquiring an evaluation value with respect to the loading state information generated for the second object, by using the loading state evaluation model; and
    deciding either the loading position of the first object or a loading position of the second object, based on the evaluation value with respect to the loading state information of the first object and the evaluation value with respect to the loading state information of the second object.

23. The information processing method according to claim 22, further comprising
    updating the evaluation value with respect to the loading state information of the first object by using a penalty value, before deciding either the loading position of the first object or the loading position of the second object.

24. The information processing method according to claim 20, wherein
    at least either a position at which a ratio of a contact region at a bottom surface of the first object to the bottom surface is a threshold value or more, or a position at which the ratio of the contact region to the bottom surface is less than the threshold value but a side surface of the first object that does not intersect the contact region is brought into contact with a sidewall of the predetermined space directly or via another object, is detected as a loading position candidate of the first object.

25. The information processing method according to claim 17, wherein
    the loading state information includes information regarding a height of loaded objects in the predetermined space.

26. The information processing method according to claim 25, wherein
    the loading state evaluation model is learned to increase the evaluation value when the object loading state related to the input loading state information is suitable for increasing a filling rate of objects in the predetermined space and uniformizing the height of the loaded objects in the predetermined space.

27. The information processing method according to claim 17, wherein
    the loading state information includes information regarding weight of the entire loaded objects in respective sections set in the predetermined space.

28. The information processing method according to claim 27, wherein
    the loading state evaluation model is learned to increase the evaluation value when the object loading state related to the input loading state information is suitable for increasing a filling rate of objects in the predetermined space and uniformizing the weight of the entire loaded objects in the respective sections set in the predetermined space.

29. The information processing method according to claim 17, wherein
    the loading state evaluation model is a neural network which outputs the evaluation value based on the loading state information.

* * * * *